United States Patent
Blackburn

(10) Patent No.: US 7,527,290 B2
(45) Date of Patent: May 5, 2009

(54) PRESSURIZED GAS RELEASE MECHANISM

(75) Inventor: Jeffery S. Blackburn, Lake Orion, MI (US)

(73) Assignee: Automotive Systems Laboratory, Inc., Armada, MI (US)

( * ) Notice: Subject to any disclaimer, the term of this patent is extended or adjusted under 35 U.S.C. 154(b) by 107 days.

(21) Appl. No.: 10/969,254

(22) Filed: Oct. 20, 2004

(65) Prior Publication Data

US 2005/0082805 A1  Apr. 21, 2005

Related U.S. Application Data

(60) Provisional application No. 60/513,072, filed on Oct. 21, 2003.

(51) Int. Cl.
*B60R 21/26* (2006.01)
*B60R 21/268* (2006.01)

(52) U.S. Cl. .............. 280/737; 280/736; 280/741; 280/742

(58) Field of Classification Search .......... 280/736, 280/737, 741, 742; 137/68.22, 68.23, 68.12; 222/3
See application file for complete search history.

(56) References Cited

U.S. PATENT DOCUMENTS

| | | | | |
|---|---|---|---|---|
| 2,736,459 A | * | 2/1956 | Cockram et al. | 220/89.4 |
| 2,920,638 A | * | 1/1960 | Heckethorn et al. | 137/68.23 |
| 3,731,948 A | * | 5/1973 | Risko | 280/737 |
| 3,743,318 A | * | 7/1973 | Yamaguchi et al. | 280/737 |
| 3,777,772 A | * | 12/1973 | Arnold et al. | 137/68.13 |
| 3,786,843 A | * | 1/1974 | Stephenson et al. | 141/13 |
| 4,097,241 A | * | 6/1978 | Garner et al. | 102/335 |
| 5,263,740 A | * | 11/1993 | Frey et al. | 280/737 |
| 5,290,060 A | | 3/1994 | Smith | 280/737 |
| 5,340,148 A | * | 8/1994 | Faigle et al. | 280/730.2 |
| 5,467,379 A | | 11/1995 | Bybee et al. | 378/57 |
| 5,468,015 A | * | 11/1995 | Goetz | 280/737 |
| 5,558,366 A | | 9/1996 | Fogle, Jr. et al. | 280/736 |
| 5,607,181 A | * | 3/1997 | Richardson et al. | 280/737 |
| 5,642,903 A | | 7/1997 | Headley | |
| 5,678,856 A | * | 10/1997 | Headley | 280/737 |

(Continued)

OTHER PUBLICATIONS

Office Action U.S. Appl. No. 11/260,824, filed Oct. 27, 2005, dated for Jan. 26, 2007.

(Continued)

*Primary Examiner*—Paul N. Dickson
*Assistant Examiner*—George D. Spisich
(74) *Attorney, Agent, or Firm*—L.C. Begin & Associates, PLLC.

(57) ABSTRACT

A mechanism (10) for releasably confining pressurized fluid in a container (18). The mechanism includes a rupturable membrane (22) configured to obstruct flow of the pressurized fluid from the container when externally supported against pressure exerted by the fluid. The membrane (22) is rupturable by pressure exerted by the fluid when not externally supported against the pressure exerted by the fluid. A support member (28) supports the membrane (22) against fluid pressure. The support member (28) fracturable upon exposure to combustion products formed by activation of a gas generator (66). Upon activation of the gas generator (66), the combustion products contact the support member (28) to decompose and/or fracture the support member (28), thereby removing support for the membrane (22) and enabling rupture of the membrane (22) by the pressurized fluid, releasing the pressurized fluid from the container.

32 Claims, 3 Drawing Sheets

U.S. PATENT DOCUMENTS

| | | | | |
|---|---|---|---|---|
| 5,743,480 A * | 4/1998 | Kopetzky et al. | ............ | 242/374 |
| 5,743,557 A | 4/1998 | Butt | ............ | 280/737 |
| 5,936,186 A | 8/1999 | Wier | ............ | 102/202.14 |
| 6,029,995 A | 2/2000 | Fink | | |
| 6,062,599 A * | 5/2000 | Forbes et al. | ............ | 280/737 |
| 6,068,293 A * | 5/2000 | Shirk et al. | ............ | 280/737 |
| 6,126,197 A | 10/2000 | Muir et al. | ............ | 280/741 |
| 6,206,420 B1 * | 3/2001 | Skanborg et al. | ............ | 280/737 |
| 6,419,265 B1 * | 7/2002 | Breed | ............ | 280/735 |
| 6,572,141 B2 * | 6/2003 | Nanbu | ............ | 280/736 |
| 6,796,580 B1 | 9/2004 | Kubo et al. | ............ | 280/741 |
| 7,293,797 B2 * | 11/2007 | Nakayasu et al. | ............ | 280/737 |
| 2005/0052007 A1 * | 3/2005 | Blackburn et al. | ............ | 280/737 |
| 2006/0214404 A1 | 9/2006 | Blackburn | ............ | 280/737 |

OTHER PUBLICATIONS

Office Action U.S. Appl. No. 11/260,824, filed Oct. 27, 2005, dated for Jul. 13, 2007.
Office Action U.S. Appl. No. 11/260,824, filed Oct. 27, 2005, dated for Jul. 27, 2006.

\* cited by examiner

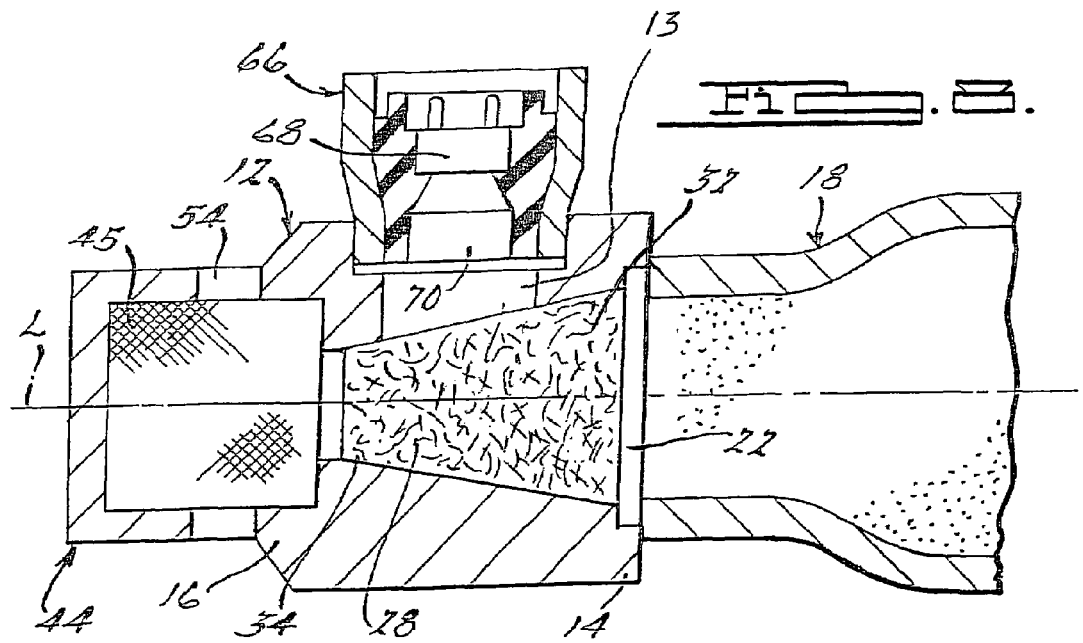
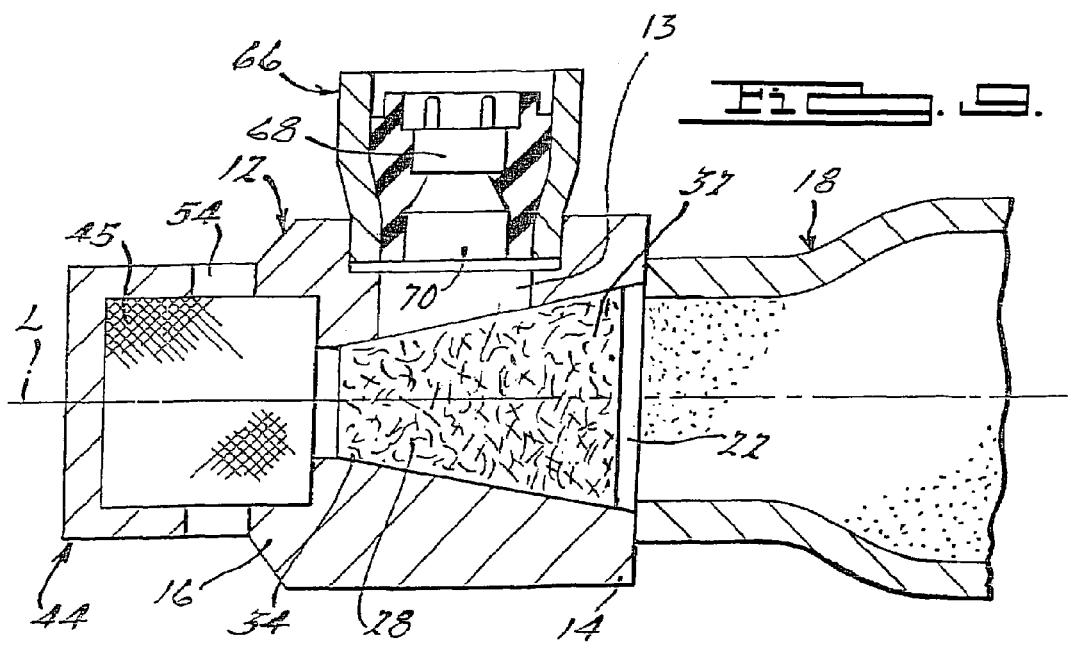

PRESSURIZED GAS RELEASE MECHANISM

CROSS-REFERENCE TO RELATED APPLICATIONS

This application claims the benefit of U.S. Provisional Application Ser. No. 60/513,072 filed on Oct. 21, 2003.

BACKGROUND OF THE INVENTION

The present invention relates to inflators used to inflate air bags in an automobile occupant protection system and, more particularly, to a mechanism for releasably containing a pressurized inflation fluid in a container used in a stored gas inflator.

Inflation systems for deploying an air bag in a motor vehicle generally employ a gas generator in fluid communication with an uninflated air bag. The gas generator is typically triggered by a firing circuit when a sensor determines that vehicle acceleration has exceeded a predetermined threshold value (for example, through the use of an acceleration-responsive inertial switch.)

Air bag inflation systems often utilize a stored gas generator (or hybrid gas generator) housed within the B-pillar of a car, for example. Stored gas generators contain pressurized gas that is released to inflate the airbag upon receipt of a predetermined signal from the sensor. An ongoing challenge is to reduce the time required to release the stored gas upon a crash event. Furthermore, improved safety and reduced manufacturing costs are also ongoing concerns. Improvements in any of these areas would provide an advantage over state-of-the-art gas release systems.

SUMMARY OF THE INVENTION

In accordance with the present invention, a mechanism for releasably confining pressurized fluid in a container is provided. The mechanism includes a rupturable membrane (for example, a burst disk) in is fluid communication with an interior of the container, thereby exposing the membrane to the fluid. The membrane is configured to obstruct flow of the pressurized fluid when externally supported against pressure exerted by the fluid. The membrane is also rupturable by pressure exerted by the fluid when not externally supported against the pressure exerted by the fluid. A support member is provided for externally supporting the membrane against pressure exerted by the fluid. The support member is configured to be fracturable upon exposure to combustion products formed by activation of a gas generator. Upon activation of the gas generator, combustion products formed by the gas generator contact the support member to decompose and/or fracture the support member, thereby removing support for the membrane and enabling rupture of the membrane by the pressurized fluid, releasing the pressurized fluid.

The mechanism described above may be incorporated into an inflator which includes a pressurized gas bottle having an opening which is sealed prior to activation of a gas generator, and a housing coupled to the gas bottle over the opening. The housing defines a gas passage, and has a first end, a second end, and a longitudinal axis extending between the first and second ends. The support member is fixed within the passage and is positioned over the bottle opening prior to gas generator activation to prevent gas flow through the housing passage. A gas generator is coupled to the housing and is spaced apart from the longitudinal axis. The gas generator is positioned so as to fluidly communicate with the support member upon gas generator activation.

BRIEF DESCRIPTION OF THE DRAWINGS

In the drawings illustrating embodiments of the present invention:

FIG. 8 is a cross-sectional view of a first alternative embodiment of the mechanism shown in FIG. 5, showing a rupturable membrane secured to the housing outside the gas flow passage; and FIG. 9 is a cross-sectional view of a second alternative embodiment of the mechanism shown in FIG. 5. showing a rupturable membrane secured to the housing inside the gas flow passage.

DETAILED DESCRIPTION

FIGS. 1-6 show one embodiment of an inflator 8 incorporating a mechanism 10 for releasably containing pressurized fluid in a container, in accordance with the present invention.

Figure 1:
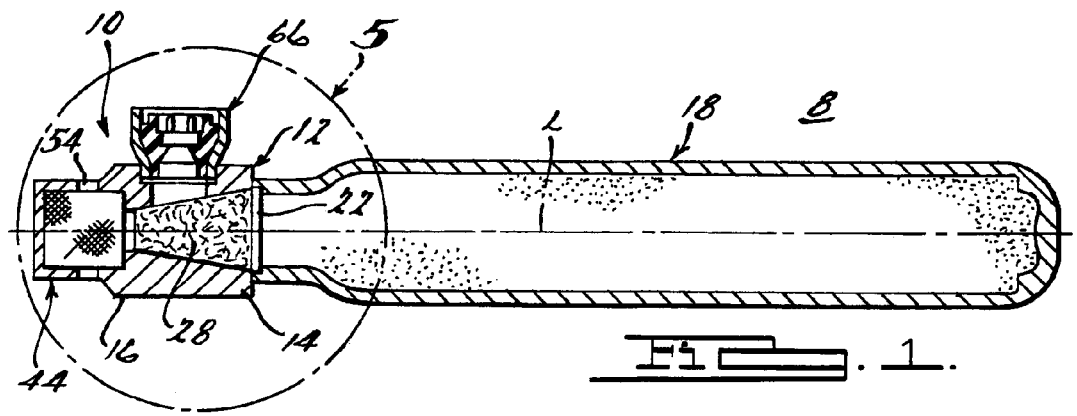
FIG. 1 is a cross-sectional view of an inflator incorporating a mechanism for releasably confining pressurized fluid in a container, in accordance with the present invention.
Figure 2:
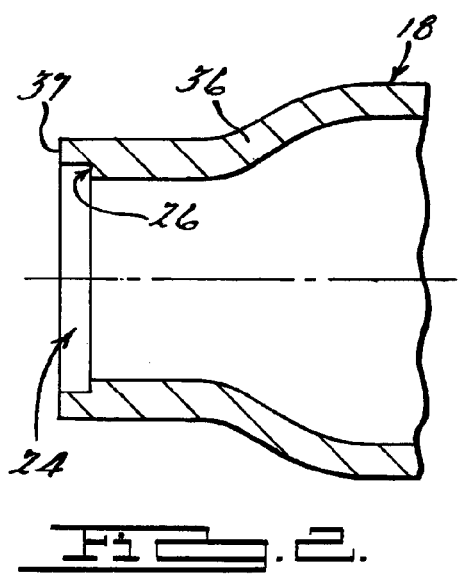
FIG. 2 is a partial cross-sectional view of a container for storing pressurized inflation fluid in accordance with the present invention.
Figure 3:
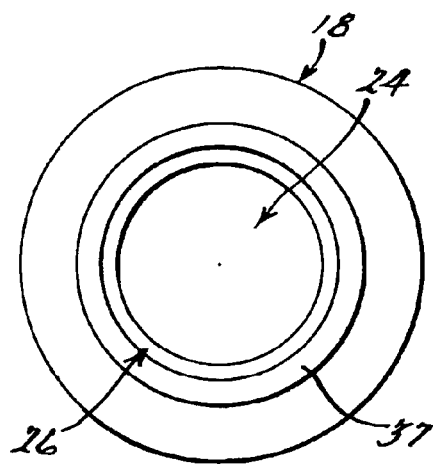
FIG. 3 is an end view of the container shown in FIG. 2.

Referring to FIGS. 1-3, mechanism 10 is shown secured to a gas bottle or tank 18 in which a pressurized fluid (in this case, an inflation gas) is stored. Bottle 18 has an annular wall 36 defining an opening 24, with an annular shoulder 37 extending from annular wall 36 to form an annular ledge 26 along a base portion of shoulder 37.

Figure 5:
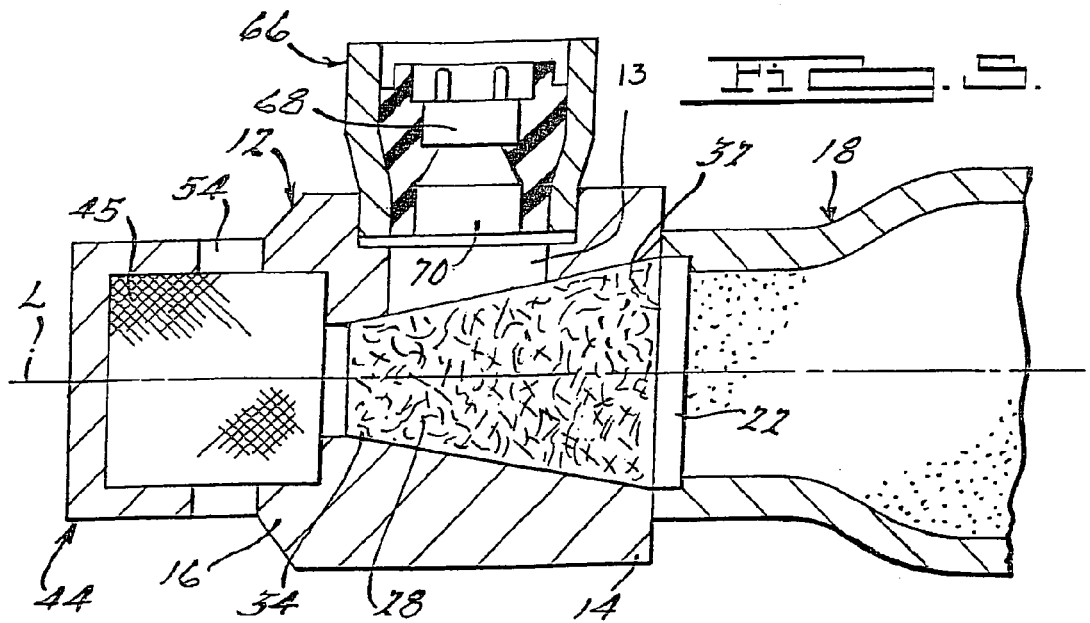
FIG. 5 is an enlarged view taken with the circle 5 of FIG. 1 showing a cross-sectional view of the mechanism shown in FIG. 1.

Referring to FIGS. 1 and 5, mechanism 10 includes a rupturable membrane 22 (for example, a burst disk) secured in fluid communication with an interior of bottle 18. Membrane 22 forms a fluid-tight barrier preventing flow of pressurized gas through or around the membrane. In the embodiment shown in FIGS. 1, 2 and 5, membrane 22 is seated along gas bottle annular ledge 26 and welded or otherwise secured thereon to obstruct flow of the pressurized fluid during normal vehicular operation. Membrane 22 is configured to obstruct flow of the pressurized fluid when externally supported against pressure exerted by the fluid by a support member 28, as described in detail below. Membrane 22 is also configured to be rupturable by pressure exerted by the fluid when not externally supported against this pressure.

Membrane 22 may be stamped or formed from any of various disks, foils, films, etc., as is known in the art. The materials and structure of the membrane will depend on the pressure of the gas sealed in bottle 18 and the desired performance characteristics of inflator 8. For example, disks made from materials and/or having structures which are relatively more or less readily ruptured may be used.

Figure 4:
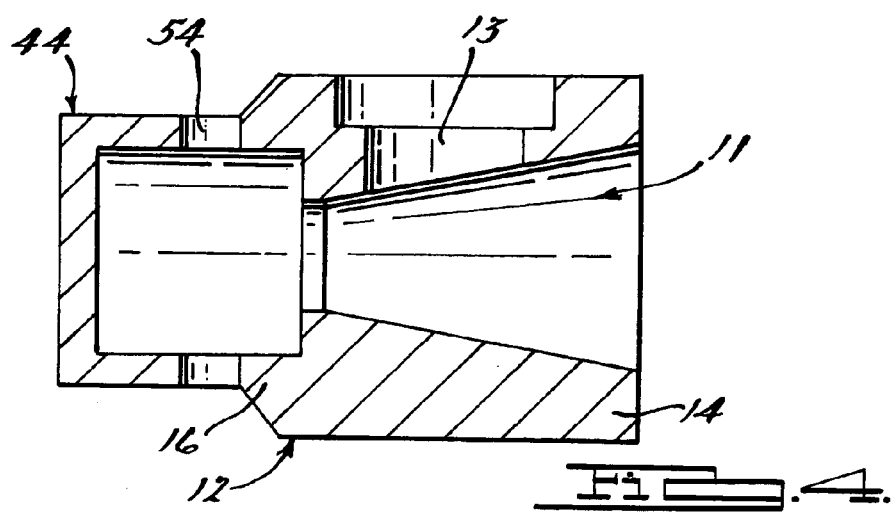
FIG. 4 is a cross-sectional view of a housing used in the embodiment of the mechanism for releasably confining pressurized fluid in a container interior shown in FIG. 1.

Referring to FIGS. 1, 4, and 5, in accordance with the present invention, a support member 28 abuts membrane 22 to bias the membrane against ledge 26, thereby providing external support to the membrane against pressure exerted by fluid stored in bottle 18. As shown in FIG. 5, support member 28 is tapered from a first end 32 to a second end 34. First end 32 has a diameter slightly larger than a diameter of annular ledge 26 formed in bottle wall 36 adjacent bottle opening 24. Accordingly, support member first end 32 forms an interference fit with shoulder 37 to cover membrane 22. When support member 28 is buttressed against membrane 22, the support member supports membrane 22 against pressure exerted by pressurized gas in bottle 18, thereby preventing pressurized gas in bottle 18 from rupturing membrane 22 during normal vehicular operation.

Support member 28 may be formed from a polymeric material that decomposes in the presence of heat and, as explained below, also fractures upon contact with gases resulting from combustion of a gas generant compound. For example, support member 28 may be made from a two-part epoxy resin. The epoxy or polymeric composition used to form the support member 28 may be obtained, for example, from ITW Devcon of Danvers, Mass. under the trade name "5-Minute Epoxy Resin". The primary constituents of the epoxy resin include bisphenol A diglycidyl ether resin in an amount greater than 60% by weight. The "5-Minute Epoxy Resin" may be employed with a "5-Minute Epoxy Hardener" also provided by ITW Devcon of Danvers, Mass. The primary constituents of the epoxy hardener include a mercaptan amine blend in an amount preferably ranging from 90-100% by weight. Other two-part epoxy compositions include, but are not limited to, "Epoxy Plus Resin" and "Epoxy Plus Hardener" also provided by ITW Devcon. The resin composition includes aminoethylpiperazine at about 10-30% by weight of the total composition, nonylphenol at about 10-20% by weight of the total composition, polyamide of C18 fatty acid dimmers and 1,4,8,11-tetraazacyclotetradecane-N,N',N'',N'''-tetraacetic acid (TETA) at about 1-5% by weight of the total composition, and 2,4,6-Tris(Dimethylaminomethyl)phenol at about 5-10% by weight of the total composition. The hardener composition includes bisphenol A diglycidyl ether resin at about 30-60% by weight of the total composition, an acrylate at about 1-5% by weight of the total composition, and butylated bisphenol A epoxy resin at about 30-60% by weight of the total composition. Other suitable two-pan epoxies or polymers are also contemplated.

In the embodiment shown in FIGS. 1-6, support member 28 is fixed within a passage 11 formed in an elongated housing 12 secured to container 18. Housing 12 contains a first end 14, a second end 16, and passage 11 for receiving the pressurized fluid therethrough. Passage 11 extends between housing first end 14 and housing second end 16. A connecting passage 13 in communication with passage 11 is formed in housing 12 to enable fluid communication between passage 11 and a gas generator, as described in greater detail below. Housing 12 is fabricated (for example, by stamping, casting, forming, or some other, suitable process) from a rigid material such as carbon steel or stainless steel. In addition, passage 11 is tapered to conform to the shape of support member 28, as described above. This enables housing 12 to brace support member 28 in a position abutting membrane 22. Shaping passage 11 in correspondence with a desired shape of support member 28 also enables the housing to be used as a mold, or vessel, to fabricate the support member within the housing. Support member 28 may be formed within housing 12 by injecting or pouring an epoxy compound into a portion of housing 12 machined or formed to the desired shape of support member 28. In the case where support member 28 is formed within housing 12, the epoxy is positioned in the housing according to manufacturer instructions and then cured within housing 12. Alternatively, Support member 28 may be preformed and inserted into housing 12 during assembly of mechanism 10.

In an alternative embodiment (not shown), the support member is secured to a part of the assembly other than the housing (for example, to bottle 18). In another alternative embodiment (not shown), rather than securing membrane 22 to bottle 18, membrane 22 is secured within housing passage 11. In yet another alternative embodiment (also not shown), membrane 22 is secured to housing 12 outside passage 11.

Referring again to FIG. 5, a gas generator 66 is positioned in relation to housing 12 so as to enable fluid communication with support member 28 upon activation of the gas generator. In the embodiment shown, gas generator 66 is crimped or otherwise suitably secured to the periphery of housing 12 and extends through a wall of the housing so that, upon activation of gas generator 66, the gas generator is in fluid communication with passage 11 via connecting passage 13. In addition, it may be seen from FIGS. 1 and 5 that membrane 22 and support member 28 lay along a common axis L extending between the housing first end 14 and housing second end 16. It may also be seen that gas generator 66 is spaced apart from axis L. Stated another way, gas generator 66 does not intersect axis L along which membrane 22 and support member 28 are positioned. As used herein, the term "axis" is understood to designate a line in relation to which parts of a structure or body may be referenced.

An igniter 68 is contained within the generator 66 and ignitably communicates with a gas generant 70 also contained within generator 66. Gas generant 70 may comprise any gas generant composition known for its utility in vehicle occupant protection systems. Co-owned U.S. Pat. Nos. 5,035,757, 5,756,929, 5,872,329, 6,077,371, 6,074,502, and 6,210,505 are incorporated herein by reference and exemplify, but do not limit gas generant compositions contemplated in accordance with the present invention.

In one embodiment, gas generant 70 comprises a mixture of silicone as a fuel at about 10-25% by weight, and an oxidizer such as ammonium or potassium perchlorate at about 75-90% by weight. Silicone not only functions as a fuel but also functions as a binder thereby facilitating the formation of pliant cylindrical gas generant extrusions. In a particular embodiment, gas generant 70 comprises silicone as a fuel at about 10-25% by weight; a perchlorate oxidizer such as ammonium, lithium, or potassium perchlorate; and a strontium salt such as strontium nitrate or strontium carbonate as a coolant, wherein the oxidizer and coolant comprise about 75-90% by weight of the gas generant. The silicone may be purchased, for example, from General Electric or other well-known suppliers. The other gas generant constituents may be provided by suppliers or by manufacturing methods well known in the art.

In another particular embodiment, gas generant composition 70 comprises, in percents by weight, 10-25% silicone, 75-90% oxidizer, 1-30% coolant, and 1-20% of a slag-forming constituent. The oxidizer may be selected from, for example, inorganic perchlorates and nitrates such as sodium perchlorate, potassium perchlorate, ammonium perchlorate, potassium nitrate, ammonium nitrate, and phase stabilized ammonium nitrate. The coolant may, be selected from for example metal hydroxides such as aluminum hydroxide; metal carbonates such as calcium carbonate, magnesium carbonate, strontium carbonate, and sodium carbonate; and inorganic oxalates such as calcium oxalate, strontium oxalate, and ammonium oxalate. The slag-forming constituent may be selected from for example metal oxides such as aluminum oxide and iron oxide. It has been found that gas generating compositions containing silicone and a perchlorate oxidizer burn at relatively lower temperatures when a coolant, in accordance with the present invention, is added to the mixture. As a result, the cooling requirements of gas generated within the mechanism 10 can be substantially minimized while still providing sufficient heat to fracture and decompose the support member 28.

A hollow diffuser 44 is machined or otherwise formed from steel or other suitable materials, and then welded or otherwise fixed to housing second end 16. Diffuser 44 functions to distribute gas flowing from first end 14 through passage 11 to housing second end 16. A plurality of gas discharge orifices 54 is spaced about a circumference of the diffuser. The embodiment shown in FIGS. 1 and 5 includes four gas discharge orifices 54 evenly spaced about the circumference of the diffuser. The diffuser may incorporate a filter 45 therein to filter combustion products and fragments of support member 28 from the inflation fluid prior to gas distribution. Any suitable metallic mesh filter or woven wire cloth may be used, many examples of which are known and obtainable from commercially available sources (for example, Wayne Wire Cloth Products, Inc. of Bloomfield Hills, Mich.)

Operation of mechanism 10 will now be discussed.

Figure 6:
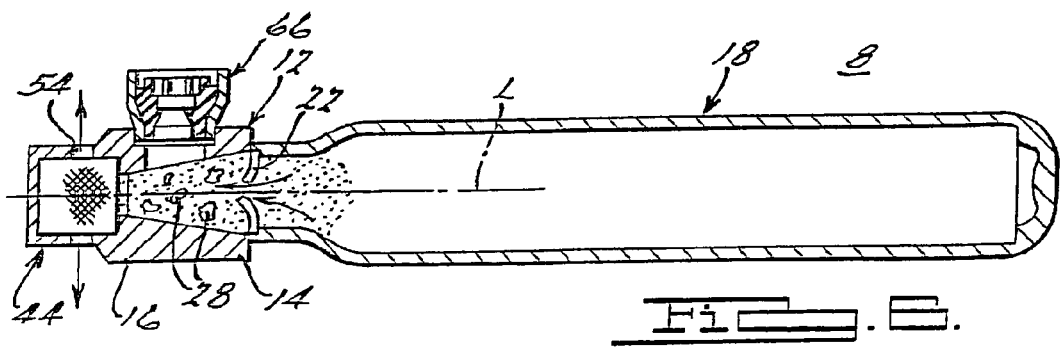
FIG. 6 is a cross-sectional view of the inflator shown in FIG. 1 showing fracturing of a support member during operation of the inflator.

Upon a crash event, the igniter 68 receives a signal from a crash sensor or accelerometer (not shown), for example, and then ignites gas generant 70. Heat and combustion gases produced by ignition of gas generant 70 proceed along connecting passage 13 to passage 11 where support member 28 is positioned. As seen in FIGS. 4 and 6, the heat and combustion products are directed toward axis L upon activation of gas generator 66. Also, in the embodiment shown, the combustion products are directed along a line substantially orthogonal to axis L. In alternative embodiments, heat and combustion products from the gas generator are directed generally toward where support member 28 resides, although not necessarily along a straight line or along a line orthogonal to axis L. Contact with heat and combustion products from gas generator 66 decomposes and/or fractures support member 28. This removes support for the rupturable membrane and allows the gas pressure within bottle 18 to rupture membrane 22. Stored inflation fluid within bottle 18 then flows through membrane 22 and through passage 11, into diffuser 44, and out of housing 12 into an airbag (not shown). Filter 45 in diffuser 44 traps fractured portions of support member 28 within the diffuser to prevent their entry into the airbag.

Figure 7:
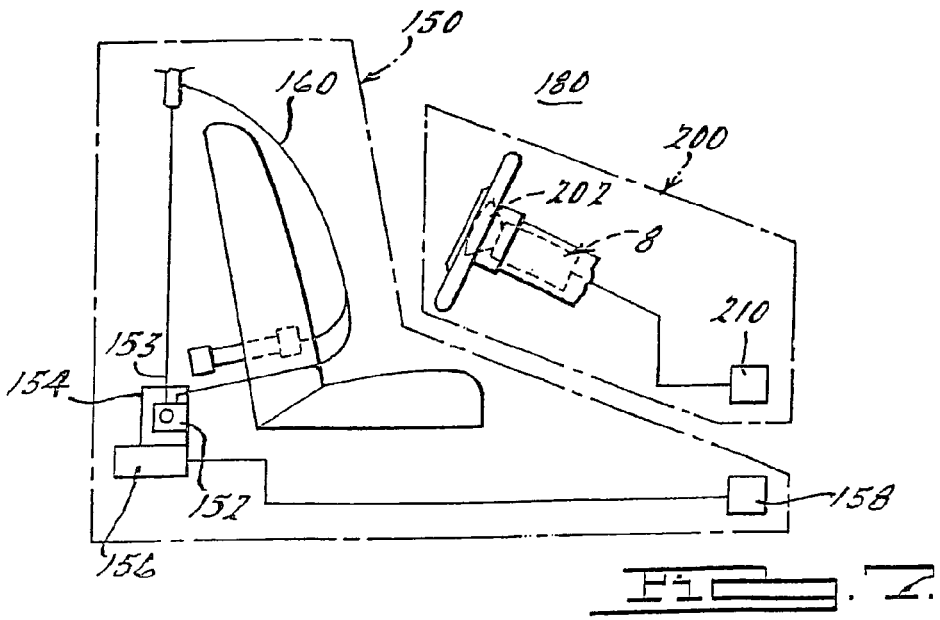
FIG. 7 is a schematic view of an airbag system and a vehicle occupant restraint system incorporating an inflator using the pressurized fluid containment mechanism of the present invention.

Any embodiment of the inflator described herein may be incorporated into an airbag system 200, as seen in FIG. 7. Airbag system 200 includes at least one airbag 202 and an inflator 8 coupled to airbag 202 so as to enable fluid communication with an interior of the airbag. Airbag system 200 may also be in communication with a crash event sensor 210 including a known crash sensor algorithm that signals actuation of airbag system 200 via, for example, activation of airbag igniter 68 in the event of a collision.

Referring again to FIG. 7, an embodiment of the inflator or an airbag system including an embodiment of the inflator may be incorporated into a broader, more comprehensive vehicle occupant restraint system 180 including additional elements such as a safety belt assembly, as seen in FIG. 7. Safety belt assembly 150 includes a safety belt housing 152 and a safety belt 160 in accordance with the present invention extending from housing 152. A safety belt retractor mechanism 154 (for example, a spring-loaded mechanism) may be coupled to an end portion 153 of the belt. In addition, a safety belt pretensioner 156 may be coupled to belt retractor mechanism 154 to actuate the retractor mechanism in the event of a collision.

Typical seat belt retractor mechanisms which may be used in conjunction with the safety belt embodiments of the present invention are described in U.S. Pat. Nos. 5,743,480, 5,553,803, 5,667,161, 5,451,008, 4,558,832 and 4,597,546, incorporated herein by reference. Illustrative examples of typical pretensioners with which the safety belt embodiments of the present invention may be combined are described in U.S. Pat. Nos. 6,505,790 and 6,419,177, incorporated herein by reference.

Safety belt system 150 may be in communication with a crash event sensor 158 (for example, an inertia sensor or an accelerometer) including a known crash sensor algorithm that signals actuation of belt pretensioner 156 via, for example, activation of a pyrotechnic igniter (not shown) incorporated into the pretensioner. U.S. Pat. Nos. 6,505,790 and 6,419,177, previously incorporated herein by reference, provide illustrative examples of pretensioners actuated in such a manner.

It will be understood that the foregoing description of the present invention is for illustrative purposes only, and that the various structural and operational features herein disclosed are susceptible to a number of modifications, none of which departs from the spirit and scope of the present invention. The preceding description, therefore, is not meant to limit the scope of the invention. Rather, the scope of the invention is to be determined only by the appended claims and their equivalents.

The invention claimed is:

1. A mechanism for releasably confining pressurized fluid in a container comprising:

a rupturable membrane in fluid communication with an interior of the container, the rupturable membrane being configured to obstruct flow of the pressurized fluid when externally supported against pressure exerted by the fluid, the rupturable membrane being rupturable by pressure exerted by the fluid when not externally supported against pressure exerted by the fluid, a support member for externally supporting the rupturable membrane against pressure exerted by the fluid, the support member being fracturable and/or decomposable upon exposure to combustion products formed by activation of a gas generator, said gas generator including a gas generant and an igniter in ignitable communication with gas generant, wherein combustion products formed by activation of the gas generator contact the support member, thereby fracturing and/or decomposing the support member to remove support for the rupturable membrane and enabling rupture of the membrane to release the pressurized fluid therethrough, wherein the rupturable membrane and the support member lie along a common axis and the gas generator is spaced apart from the axis.

2. The mechanism of claim 1 further comprising:

a housing secured to the container and defining a passage for receiving the pressurized fluid therethrough, and wherein the rupturable membrane is configured to obstruct flow of the pressurized fluid through the housing passage when externally supported against pressure exerted by the fluid.

3. The mechanism of claim 2 wherein the support member is secured to the housing.

4. The mechanism of claim 2 wherein the support member is positioned within the passage.

5. The mechanism of claim 2 wherein the gas generator is secured to the housing.

6. The mechanism of claim 2 further comprising a diffuser coupled to the housing for distributing pressurized gas flowing through the passage.

7. The mechanism of claim 2 wherein the support member is formed as separate part and coupled to the housing.

8. The mechanism of claim 2 wherein the support member is formed within the housing.

9. The mechanism of claim 2 wherein the membrane is secured to the housing outside the passage.

10. The mechanism of claim 2 wherein the membrane is secured to the housing inside the passage.

11. The mechanism of claim 1 wherein the a gas generator positioned so as to enable fluid communication with the support member upon activation of the gas generator and is configured for producing combustion products suitable for fracturing the support member.

12. The mechanism of claim 1 wherein the rupturable membrane and the support member lie along a common axis and the gas generator is spaced apart from the axis.

13. The mechanism of claim 1 wherein combustion products are directed toward the axis upon activation of the gas generator, to impinge upon the support member, thereby producing fracturing and/or decomposition of the support member.

14. The mechanism of claim 13 wherein the combustion products are directed along a line substantially orthogonal to the axis.

15. The mechanism of claim 1 wherein the support member abuts the rupturable member.

16. The mechanism of claim 1 wherein the support member is formed from an epoxy.

17. The mechanism of claim 16 wherein the support member is formed from an epoxy comprising a bisphenol A diglycidyl ether resin at about 60 percent by weight.

18. The mechanism of claim 17 wherein the support member further comprises a mercaptan amine blend ranging from 90-100 percent by weight.

19. The mechanism of claim 16 wherein the support member is formed from an epoxy comprising aminoethylpiperazine at about 10-30 percent by weight, nonylphenol at about 10-20 percent by weight, polyamide of C18 fatty acid dimmers and 1,4,8,11-tetraazacyclotetradecane-N',N',N'',N'''-tetraacetic acid (TETA) at about 1-5 percent by weight, and 2,4,6-Tris(Dimethylaminomethyl)phenol at about 5-10 percent by weight.

20. The mechanism of claim 19 wherein the support member further comprises bisphenol A diglycidyl ether resin at about 30-60 percent by weight, an acrylate at about 1-5 percent by weight, and butylated bisphenol A epoxy resin at about 30-60 percent by weight.

21. The mechanism of claim 16 wherein the epoxy comprises a two-part epoxy.

22. The mechanism of claim 1 wherein the support member is formed from a polymer compound.

23. The mechanism of claim 1 wherein the membrane is secured to the container.

24. The mechanism of claim 1 wherein the gas generator is spaced apart from the support member.

25. An airbag system including a mechanism in accordance with claim 1.

26. A vehicle occupant restraint system including a mechanism in accordance with claim 1.

27. An inflator including a mechanism in accordance with claim 1.

28. An inflator comprising:
a pressurized gas bottle having an opening, said opening sealed prior to gas generator activation;
a housing coupled to said bottle covering said opening, said housing defining a gas passage, a first end, a second end, and a longitudinal axis extending through said first and second ends;
a support member fixed within said passage and over said opening prior to gas generator activation whereby said support member prevents gas flow through said passage;
a gas generator coupled to said housing and removed from said axis whereby, upon gas generator activation, said gas generator fluidly communicates with said support member, said gas generator including a gas generant and an igniter in ignitable communication with the gas generant,
wherein, upon inflator activation, said gas generator provides gases that fracture and/or initiate decomposition of said support member, thereby releasing gas from said bottle for passage through said housing, and wherein a rupturable membrane covers the gas bottle opening to seal the opening, and wherein the support member prevents gas flow through said passage by supporting said membrane.

29. The inflator of claim 28 further comprising a diffuser fixed within the housing so as to enable fluid communication with the passage for dispersing inflation gases flowing thereto from the passage, the diffuser including a plurality of gas discharge orifices spaced about a circumference of the diffuser.

30. An airbag system comprising:
at least one airbag; and
an airbag inflator coupled to the airbag so as to enable fluid communication with an interior of the airbag for inflating the airbag in the event of a collision, the inflator including:
a rupturable membrane in fluid communication with an interior of the container, the rupturable membrane being configured to obstruct flow of the pressurized fluid when externally supported against pressure exerted by the fluid, the rupturable membrane being rupturable by pressure exerted by the fluid when not externally supported against pressure exerted by the fluid,
a support member for externally supporting the rupturable membrane against pressure exerted by the fluid, the support member being fracturable and/or decomposable upon exposure to combustion products formed by activation of a gas generator, said gas generator including a gas generant and an igniter in ignitable communication with the gas generant,
wherein combustion products formed by activation of the gas generator contact the support member, thereby fracturing and/or decomposing the support member to remove support for the rupturable membrane and enabling rupture of the membrane to release the pressurized fluid therethrough, and
wherein the rupturable membrane and the support member lie along a common axis and the gas generator is spaced apart from the axis.

31. A vehicle occupant restraint system comprising:
a safety belt assembly including a housing and a safety belt extending from the housing, and an airbag system comprising at least one airbag and an airbag inflator having a mechanism for releasably confining pressurized gas in a container, the mechanism including:
a rupturable membrane in fluid communication with an interior of the container, the rupturable membrane being configured to obstruct flow of the pressurized fluid when externally supported against pressure exerted by the fluid, the rupturable membrane being rupturable by pressure exerted by the fluid when not externally supported against pressure exerted by the fluid, a support member for externally supporting the rupturable membrane against pressure exerted by the fluid, the support member being fracturable and/or decomposable upon exposure to combustion products formed by activation of a gas generator, said gas generator including a gas generant and an igniter in ignitable communication with the gas generant, wherein combustion products formed by activation of the gas generator contact the support member, thereby fracturing and/or decomposing the support member to remove support for the rupturable membrane and enabling rupture of the membrane to release the pressurized fluid therethrough, and wherein the rupturable membrane and the support member lie along a common axis and the gas generator is spaced apart from the axis.

32. The vehicle occupant restraint system of claim 31 wherein the vehicle occupant restraint system is in communication with a crash event sensor including a crash sensor algorithm that signals actuation of the airbag system in the event of a collision.

* * * * *

UNITED STATES PATENT AND TRADEMARK OFFICE
CERTIFICATE OF CORRECTION

| | | |
|---|---|---|
| PATENT NO. | : 7,527,290 B2 | Page 1 of 1 |
| APPLICATION NO. | : 10/969254 | |
| DATED | : May 5, 2009 | |
| INVENTOR(S) | : Blackburn | |

It is certified that error appears in the above-identified patent and that said Letters Patent is hereby corrected as shown below:

On the Title Page Item (57) In the Abstract, Line 9, please insert --is-- before fracturable Column 6, Claim 1, Line 44, please insert --the-- before gas Column 7, Claim 6, Line 3, please delete "through" and insert --thereto from--

Column 7, Claim 7, Line 5, please insert --a-- before separate

Column 7, Claim 11, Line 13, please insert --is-- before positioned

Column 7, Claim 7, Lines 4-5 was canceled. In the published patent, former claim 7 (now cancelled) appears as claim 12. As such, claim 12 should be cancelled, and the claims renumbered.

Column 7, Claim 19, Line 42, please delete "N'" and insert --N--

Signed and Sealed this

Fifteenth Day of June, 2010

David J. Kappos
*Director of the United States Patent and Trademark Office*